United States Patent
Osawa

(10) Patent No.: US 7,879,943 B2
(45) Date of Patent: Feb. 1, 2011

(54) FILM-FORMING ORGANOPOLYSILOXANE EMULSION COMPOSITION

(75) Inventor: Yoshihito Osawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 56 days.

(21) Appl. No.: 12/389,769

(22) Filed: Feb. 20, 2009

(65) Prior Publication Data

US 2009/0215955 A1    Aug. 27, 2009

(30) Foreign Application Priority Data

Feb. 22, 2008    (JP) .............................. 2008-041372

(51) Int. Cl.
*C08L 83/04* (2006.01)
*C08G 77/04* (2006.01)
*C09K 3/00* (2006.01)

(52) U.S. Cl. ........................... 524/588; 528/10; 516/53; 516/55

(58) Field of Classification Search .................. 524/588
See application file for complete search history.

(56) References Cited

U.S. PATENT DOCUMENTS

| | | | | |
|---|---|---|---|---|
| 4,383,062 A * | 5/1983 | Saad et al. | ...................... | 524/35 |
| 4,582,874 A * | 4/1986 | Grape et al. | .................. | 524/588 |
| 4,661,556 A * | 4/1987 | Huebner et al. | .............. | 524/745 |
| 4,859,359 A * | 8/1989 | DeMatteo et al. | ............ | 510/400 |
| 5,004,771 A * | 4/1991 | Feder et al. | .................. | 524/161 |
| 5,140,061 A * | 8/1992 | Feder | ........................... | 524/783 |
| 5,254,621 A | 10/1993 | Inoue et al. | | |
| 5,449,712 A * | 9/1995 | Gierke et al. | ................. | 524/266 |
| 5,973,061 A * | 10/1999 | Feder et al. | .................. | 524/588 |
| 6,025,077 A * | 2/2000 | Yamaki et al. | ............... | 428/447 |
| 6,521,699 B2 * | 2/2003 | Feder et al. | .................. | 524/588 |
| 6,545,086 B1 * | 4/2003 | Kosal | .......................... | 524/806 |
| 6,737,444 B1 * | 5/2004 | Liu | .............................. | 516/55 |
| 2001/0031818 A1 * | 10/2001 | Feder et al. | .................. | 524/442 |
| 2006/0025517 A1 * | 2/2006 | Guichard et al. | ............ | 524/588 |
| 2006/0167176 A1 * | 7/2006 | Osawa et al. | ................. | 524/588 |
| 2007/0042124 A1 | 2/2007 | Matsumura et al. | | |
| 2007/0116969 A1 * | 5/2007 | Liu | .............................. | 428/447 |
| 2008/0125542 A1 * | 5/2008 | Yamaya et al. | ............... | 524/837 |

FOREIGN PATENT DOCUMENTS

| | | |
|---|---|---|
| JP | 5-98579 A | 4/1993 |
| JP | 2005-325253 A | 11/2005 |
| JP | 2007-51236 A | 3/2007 |
| WO | 2005/040250 A1 | 5/2005 |

* cited by examiner

*Primary Examiner*—Randy Gulakowski
*Assistant Examiner*—Robert Loewe
(74) *Attorney, Agent, or Firm*—Westerman, Hattori, Daniels & Adrian, LLP

(57) ABSTRACT

An organopolysiloxane emulsion composition comprising (A-1) the reaction product of a hydroxy-terminated organopolysiloxane with an organopolysiloxane comprising trialkylsiloxy and silicate units and having silanol groups and (A-2) silica, or (A-3) the reaction product of a hydroxy-terminated organopolysiloxane with an organopolysiloxane comprising trialkylsiloxy and silicate units and having silanol groups and silica having silanol groups on its surface, (B) an emulsifier, and (C) water remains fully stable and can form an organopolysiloxane film having a rubber strength simply by drying.

2 Claims, No Drawings

FILM-FORMING ORGANOPOLYSILOXANE EMULSION COMPOSITION

CROSS-REFERENCE TO RELATED APPLICATION

This non-provisional application claims priority under 35 U.S.C. §119(a) on Patent Application No. 2008-041372 filed in Japan on Feb. 22, 2008, the entire contents of which are hereby incorporated by reference.

TECHNICAL FIELD

This invention relates to an emulsion composition which can form an organopolysiloxane film simply by removing water, without a need for organometallic catalysts such as organotin catalysts.

BACKGROUND ART

Organopolysiloxanes which cure and crosslink to form rubber or resin films are used as surface coating compositions on various substrates such as fabric, wood and rubber, binders for functional inorganic fillers such as photo-catalysts, and additives to coating compositions. Most of such curable silicone resins are compositions containing metal compounds such as tin catalysts as disclosed in JP-A 5-098579, JP-A 2005-325253, and JP-A 2007-051236. However, the metal compounds such as tin catalysts are problematic from the safety aspect.

An emulsion of a silicone elastomer containing an MQ resin which is free of metal compounds such as tin catalysts is known from WO 2005/040250. In this emulsion, an organo-functional siloxane is used in combination with the silicone elastomer for easing emulsification and improving stability. Since this component does not participate in crosslinking, it is rather detrimental to film characteristics.

Citation List
Patent Document 1: JP-A 5-098579
Patent Document 2: JP-A 2005-325253
Patent Document 3: JP-A 2007-051236
Patent Document 4: WO 2005/040250 (JP-A 2007-508413)

SUMMARY OF INVENTION

An object of the invention is to provide an emulsion composition with high stability which can form an organopolysiloxane film having a rubber strength simply on drying, despite the absence of metal compounds such as tin catalysts.

The inventor has found that a film-forming organopolysiloxane emulsion composition comprising (A-1) the reaction product of a hydroxy-terminated organopolysiloxane represented by the general formula (I) with an organopolysiloxane comprising trialkylsiloxy and silicate units and having silanol groups, represented by the compositional formula (II) and (A-2) silica, or (A-3) the reaction product of a hydroxy-terminated organopolysiloxane represented by the general formula (I) with an organopolysiloxane comprising trialkylsiloxy and silicate units and having silanol groups, represented by the compositional formula (II) and silica having silanol groups on its surface, (B) an emulsifier, and (C) water remains fully stable, is free of metal compounds such as tin catalysts, and can form an organopolysiloxane film having a rubber strength simply on drying.

It is noted that the inventor proposed an emulsion composition comprising the reaction product of a hydroxy-terminated siloxane with an MQ resin, which is emulsified together with a water-miscible organic solvent (Japanese Patent Appln. No. 2007-285785. It would be desirable to further improve the strength of a dry rubber film of this composition.

A first embodiment provides a film-forming organopolysiloxane emulsion composition comprising
- (A-1) 100 parts by weight of the reaction product of a hydroxy-terminated organopolysiloxane represented by the general formula (I) with an organopolysiloxane comprising trialkylsiloxy and silicate units and having silanol groups, represented by the compositional formula (II),
- (A-2) 0.1 to 20 parts by weight of silica,
- (B) 1 to 50 parts by weight of an emulsifier, and
- (C) 25 to 20,000 parts by weight of water.

The formulae (I) and (II) are:

$$\text{HO}-[\text{R}^1{}_2\text{SiO}]_n-\text{H} \quad (I)$$

wherein $R^1$ is a monovalent organic group of 1 to 20 carbon atoms, hydroxyl or hydrogen, and n is a positive number of 2 to 5,000, and $$[\text{R}^2{}_3\text{SiO}_{1/2}]_a[\text{R}^2{}_2\text{SiO}_{2/2}]_b[\text{SiO}_{4/2}]_c \quad (II)$$

wherein $R^2$ is a monovalent organic group of 1 to 20 carbon atoms, hydroxyl or hydrogen, a, b and c are positive numbers in the range: $0.1 \leq a \leq 0.7$, $0 \leq b \leq 0.5$, $0.3 \leq c \leq 0.7$, and $a+b+c=1$.

A second embodiment provides a film-forming organopolysiloxane emulsion composition comprising
- (A-3) 100 parts by weight of the reaction product of a hydroxy-terminated organopolysiloxane represented by the general formula (I) with an organopolysiloxane comprising trialkylsiloxy and silicate units and having silanol groups, represented by the compositional formula (II) and silica having silanol groups on its surface,
- (B) 1 to 50 parts by weight of an emulsifier, and
- (C) 25 to 20,000 parts by weight of water.

The film-forming organopolysiloxane emulsion compositions of the first and second embodiments may further comprise (D) 1 to 50 parts by weight of a water-miscible organic solvent having an SP value in the range of 8.0 to 11.0.

As used herein, the term "hydroxy-terminated organopolysiloxane" refers to an organopolysiloxane capped with a hydroxyl group at either end.

ADVANTAGEOUS EFFECTS OF INVENTION

The emulsion composition of the invention has the advantage that an organopolysiloxane film having a rubber strength can be formed simply by drying the composition, without a need for organometallic catalysts. In addition, the emulsion is fully stable.

DESCRIPTION OF EMBODIMENTS

Component (A-1) is the reaction product of a hydroxy-terminated organopolysiloxane with an organopolysiloxane comprising trialkylsiloxy and silicate units and having silanol groups. It is produced by reacting a hydroxy-terminated organopolysiloxane with an organopolysiloxane comprising trialkylsiloxy and silicate units and having silanol groups.

One reactant, hydroxy-terminated organopolysiloxane is represented by the general formula (I):

$$\text{HO}-[\text{R}^1{}_2\text{SiO}]_n-\text{H} \quad (I)$$

wherein $R^1$ is a monovalent organic group of 1 to 20 carbon atoms, hydroxyl group or hydrogen atom, and n is a positive number of 2 to 5,000.

Specifically, $R^1$ is selected from monovalent organic groups of 1 to 20 carbon atoms, preferably 1 to 12 carbon atoms, hydroxyl groups and hydrogen atoms. Examples of $C_1$-$C_{20}$ monovalent organic groups include straight, branched or cyclic alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cycloheptyl, aryl groups such as phenyl, tolyl and naphthyl, alkenyl groups such as vinyl and allyl, alkoxy groups such as methoxy, ethoxy, propoxy, butoxy, pentyloxy, hexyloxy, heptyloxy, and octyloxy, epoxy-containing monovalent hydrocarbon groups such as 3-glycidoxypropyl and 2-(3,4-epoxycyclohexyl)ethyl, amino-containing monovalent hydrocarbon groups such as 3-aminopropyl, N-(2-aminoethyl)-3-aminopropyl, N-(1,3-dimethylbutylidene)-3-aminopropyl, and N-phenyl-3-aminopropyl, and mercapto-containing monovalent hydrocarbon groups such as 3-mercaptopropyl. It is preferred that at least 80 mol % of $R^1$ be methyl.

The subscript n is a positive number of 2 to 5,000. An organopolysiloxane of formula (I) wherein n is more than 5,000 is less reactive with an organopolysiloxane comprising trialkylsiloxy and silicate units or silica. Preferably n is a positive number of 10 to 3,000, and more preferably 30 to 1,000.

Another reactant, organopolysiloxane comprising trialkylsiloxy and silicate units and having silanol groups is represented by the compositional formula (II):

$$[R^2{}_3SiO_{1/2}]_a[R^2{}_2SiO_{2/2}]_b[SiO_{4/2}]_c \quad (II)$$

wherein $R^2$ is a monovalent organic group of 1 to 20 carbon atoms, hydroxyl or hydrogen, a, b and c are positive numbers in the range: $0.1 \leq a \leq 0.7$, $0 \leq b \leq 0.5$, $0.3 \leq c \leq 0.7$, and $a+b+c=1$.

Specifically, $R^2$ is selected from monovalent organic groups of 1 to 20 carbon atoms, hydroxyl groups and hydrogen atoms. Examples of $C_1$-$C_{20}$ monovalent organic groups include alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cycloheptyl, aryl groups such as phenyl, tolyl and naphthyl, alkenyl groups such as vinyl and allyl, alkoxy groups such as methoxy, ethoxy, propoxy, butoxy, pentyloxy, hexyloxy, heptyloxy, and octyloxy, epoxy groups such as 3-glycidoxypropyl and 2-(3,4-epoxycyclohexyl)ethyl, amino groups such as 3-aminopropyl, N-(2-aminoethyl)-3-aminopropyl, N-(1,3-dimethylbutylidene)-3-aminopropyl, and N-phenyl-3-aminopropyl, and mercapto groups such as 3-mercaptopropyl. It is preferred that at least 80 mol % of $R^2$ be methyl.

The subscripts a, b and c are positive numbers in the range: $0.1 \leq a \leq 0.7$, $0 \leq b \leq 0.5$, $0.3 \leq c \leq 0.7$, and $a+b+c=1$, and preferably $0.2 \leq a \leq 0.6$, $0 \leq b \leq 0.4$, $0.4 \leq c \leq 0.6$, and $a+b+c=1$.

These organopolysiloxanes comprising trialkylsiloxy and silicate units are known in the art, and among others, those wherein $R^2$ is methyl and b=0 are well known as MQ resins. In the organopolysiloxane comprising trialkylsiloxy and silicate units, silanol groups are left in a minor content. Then condensation reaction can take place between residual silanol groups and hydroxy groups on the hydroxy-terminated organopolysiloxane or surface hydroxy groups on silica to be described later, resulting in the desired reaction product.

To increase the content of silanol groups in the organopolysiloxane comprising trialkylsiloxy and silicate units, it is effective to incorporate $[R^2{}_2SiO_{2/2}]$ units in the organopolysiloxane. While trialkylsiloxysilicate is prepared from such reactants as a trialkylchlorosilane and water-glass, $[R^2{}_2SiO_{2/2}]$ units may be incorporated by performing synthesis in accordance with a well-known technique using a dialkyldichlorosilane in addition to the ordinary reactants. Where $[R^2{}_2SiO_{2/2}]$ units are incorporated, the value of b is $0.001 \leq b \leq 0.5$. If b is more than 0.5, the reaction product becomes less film-formable. Then b must be equal to or less than 0.5.

It is preferred from the standpoint of reactivity that the content of silanol groups be 0.01 to 2 moles per 100 grams of the organopolysiloxane of formula (II).

The hydroxy-terminated organopolysiloxane and the organopolysiloxane comprising trialkylsiloxy and silicate units are blended in a ratio between 20/80 and 90/10 by weight. If the ratio of the hydroxy-terminated organopolysiloxane is less than 20, the reaction product may become resin powder-like rather than film-like. If the ratio of the hydroxy-terminated organopolysiloxane is more than 90, the reaction product may become pasty or oily. For this reason, the ratio of the hydroxy-terminated organopolysiloxane to the organopolysiloxane comprising trialkylsiloxy and silicate units should be in the range between 20/80 and 90/10 by weight, and preferably between 30/70 and 85/15 by weight.

Reaction of the hydroxy-terminated organopolysiloxane with the organopolysiloxane comprising trialkylsiloxy and silicate units may proceed fast even at room temperature when an ammonium or amine compound is used as the catalyst. Examples of the catalyst include ammonia, ammonium compounds such as tetramethylammonium hydroxide, tetraethylammonium hydroxide, tetrapropylammonium hydroxide, and tetrabutylammonium hydroxide, monoalkylamines such as methylamine, ethylamine, propylamine, butylamine, pentylamine, hexylamine, heptylamine, octylamine, nonylamine, and decylamine, dialkylamines such as dimethylamine, diethylamine, dipropylamine, dibutylamine, dipentylamine, dihexylamine, diheptylamine, dioctylamine, dinonylamine, and didecylamine, and trialkylamines such as trimethylamine, triethylamine, tripropylamine, tributylamine, tripentylamine, trihexylamine, triheptylamine, trioctylamine, trinonylamine, and tridecylamine. From the standpoints of reaction rate and emulsion stability, tetramethylammonium hydroxide, tetrabutylammonium hydroxide, butylamine, hexylamine, octylamine, tripropylamine, and tributylamine are preferred.

The amount of the catalyst used is 0.1 to 10 parts by weight per 100 parts by weight of the hydroxy-terminated organopolysiloxane and the organopolysiloxane comprising trialkylsiloxy and silicate units and having silanol groups, combined. Outside the range, a smaller amount of the catalyst may fail to promote condensation reaction or eventual film formation whereas a larger amount of the catalyst may adversely affect the stability of the emulsion.

An appropriate reaction temperature is 0 to 50° C., and more preferably 5 to 30° C., and an appropriate reaction time is 3 to 100 hours, and more preferably 6 to 50 hours. At the end of reaction, the reaction mixture may be neutralized with an acidic compound because the emulsion then becomes more stable. Exemplary acidic compounds include acetic acid, formic acid, phosphoric acid, hydrochloric acid, sulfuric acid, and dodecylbenzenesulfonic acid.

Since the reaction product of the hydroxy-terminated organopolysiloxane with the organopolysiloxane comprising trialkylsiloxy and silicate units becomes film-like, it is difficult to emulsify the reaction product. It is then preferred that both the hydroxy-terminated organopolysiloxane and the organopolysiloxane comprising trialkylsiloxy and silicate units be previously emulsified and reaction be performed in the emulsion.

Component (A-2) is silica, represented by $SiO_2$, which includes finely divided silica and colloidal silica and serves to enhance rubber film strength. The finely divided silica is preferably untreated (not surface treated) hydrophilic silica. The finely divided silica may be used alone or in admixture of two or more species.

Examples of hydrophilic silica include wet silica such as precipitated silica and gel silica, and dry silica such as silica xerogel and fumed silica. Illustrative examples include Aerosil® (Nippon Aerosil Co., Ltd.), Nipsil® and Nipgel® (Tosoh Silica Co., Ltd.), and Sylysia® (Fuji Silysia Chemical Ltd.). Use may also be made of silica whose surface is partially treated with a silane or siloxane compound having a triorganosiloxy or diorganosiloxy group in order to improve the affinity of silica to the hydroxy-terminated organopolysiloxane.

The type of colloidal silica is not limited. Typical are those having a particle size of 5 to 50 nm and stabilized with sodium, ammonium or aluminum. The colloidal silica which can be used herein is commercially available under the trade name of Snowtex from Nissan Chemical Industries Ltd., Ludox from W. R. Grace & Co., Silicadol from Nippon Chemical Industrial Co., Ltd., Adelite AT from Adeka Co., Ltd., and Cataloid S from Catalysts & Chemicals Industries Co., Ltd.

The finely divided silica preferably has a specific surface area of at least 100 $m^2/g$, and more preferably 150 to 500 $m^2/g$, as measured by the BET method. Silica having a specific surface area of less than 100 $m^2/g$ may have less film reinforcement effects.

An appropriate amount of component (A-2) blended is 0.1 to 20 parts by weight per 100 parts by weight of component (A-1). Less than 0.1 part of component (A-2) leads to a dry film with a low rubber strength whereas more than 20 part of component (A-2) leads to a hard brittle film. Then the amount of component (A-2) blended should be 0.1 to 20 parts, preferably 0.2 to 15 parts, and more preferably 0.3 to 10 parts by weight per 100 parts by weight of component (A-1).

A further improvement in rubber film strength is expectable if silica as component (A-2) participates in the reaction of the hydroxy-terminated organopolysiloxane with the organopolysiloxane comprising trialkylsiloxy and silicate units and having silanol groups to produce component (A-1). Then, (A-3) the reaction product of a hydroxy-terminated organopolysiloxane, an organopolysiloxane comprising trialkylsiloxy and silicate units and having silanol groups and silica is advantageously used instead of a mixture of components (A-1) and (A-2).

The reaction product (A-3) results from condensation reaction among hydroxyl groups on the hydroxy-terminated organopolysiloxane, residual silanol groups on the organopolysiloxane comprising trialkylsiloxy and silicate units and having silanol groups, and hydroxyl (or silanol) groups on the surface of silica.

In this embodiment, the ratio of the hydroxy-terminated organopolysiloxane to the organopolysiloxane comprising trialkylsiloxy and silicate units and having silanol groups for reaction is between 20/80 and 90/10 by weight and preferably between 30/70 and 85/15 by weight, as in the first embodiment. If the ratio of the hydroxy-terminated organopolysiloxane is less than 20, the reaction product may become resin powder-like rather than film-like. If the ratio of the hydroxy-terminated organopolysiloxane is more than 90, the reaction product may become pasty or oily.

The ratio of the hydroxy-terminated organopolysiloxane and the organopolysiloxane comprising trialkylsiloxy and silicate units and having silanol groups to silica for reaction is such that 0.1 to 20 parts by weight of silica is present per 100 parts by weight of the hydroxy-terminated organopolysiloxane and the organopolysiloxane comprising trialkylsiloxy and silicate units and having silanol groups combined. On this basis, less than 0.1 part of silica leads to a dry film having a low rubber strength whereas more than 20 parts of silica leads to a hard brittle film. Then the amount of silica should be 0.1 to 20 parts, preferably 0.2 to 15 parts, and more preferably 0.3 to 10 parts by weight per 100 parts by weight of the organopolysiloxanes combined.

Component (B) is an emulsifier. The emulsifier is not particularly limited as long as it facilitates emulsification and dispersion in water of the reaction product of the hydroxy-terminated organopolysiloxane with the organopolysiloxane comprising trialkylsiloxy and silicate units. Exemplary emulsifiers include nonionic surfactants such as polyoxyethylene alkyl ethers, polyoxyethylene propylene alkyl ethers, polyoxyethylene alkyl phenyl ethers, and polyoxyethylene fatty acid esters; anionic surfactants such as alkylsulfates, alkylbenzenesulfonates, alkylsulfosuccinates, alkyl phosphates, polyoxyethylene alkyl ether hydrogen sulfates, and polyoxyethylene alkyl phenyl ether hydrogen sulfates; cationic surfactants such as quaternary ammonium salts and alkylamine acetates; ampholytic surfactants such as alkyl betaines and alkyl imidazolines; and water-soluble polymers such as polyvinyl alcohol.

Among others, nonionic surfactants such as polyoxyethylene alkyl ethers, polyoxyethylene propylene alkyl ethers, and polyoxyethylene alkyl phenyl ethers are preferred from the standpoint of stability. Illustrative, non-limiting examples include polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, polyoxyethylene nonyl phenyl ether, and polyoxyethylene styrenated phenyl ether. These emulsifiers may be used alone or in admixture of two or more.

More preferably, a small amount of an anionic surfactant is used in combination with a nonionic surfactant because this combination is effective in keeping the emulsion more stable.

The amount of component (B) added should be 1 to 50 parts by weight per 100 parts by weight of component (A-1). Less than 1 part of component (B) is insufficient for emulsification whereas more than 50 parts may detract from film formability. The preferred amount of component (B) is 2 to 30 parts, and more preferably 3 to 20 parts by weight per 100 parts by weight of component (A-1). In the alternative embodiment using component (A-3) instead of a mixture of components (A-1) and (A-2), the amount of component (B) added should be 1 to 50 parts, preferably 2 to 30 parts, and more preferably 3 to 20 parts by weight per 100 parts by weight of component (A-3).

In the organopolysiloxane emulsion composition of the invention, water is used as component (C). The amount of water used as component (C) should be 25 to 20,000 parts, preferably 50 to 10,000 parts by weight per 100 parts by weight of component (A-1). Outside the range, an emulsion containing a smaller amount of water has a higher viscosity and becomes inefficiently workable whereas an emulsion containing a larger amount of water becomes less stable. In the alternative embodiment using component (A-3) instead of a mixture of components (A-1) and (A-2), the amount of component (C) should be 25 to 20,000 parts, preferably 50 to 10,000 parts by weight per 100 parts by weight of component (A-3).

In the practice of the invention, it is preferred that the reaction to produce the reaction product (A-1) or (A-3) be performed in components (B) and (C). By performing the reaction in this way, an emulsion composition within the scope of the invention is obtained. More specifically, component (A-1), i.e., the reaction product of organopolysiloxane of formula (I) with organopolysiloxane of formula (II) may be obtained by emulsifying a mixture of both the organopolysiloxanes in components (B) and (C), and allowing the organopolysiloxanes to react with each other in the emulsion under the above-mentioned reaction conditions. Silica is then added as component (A-2) to the reaction mixture, yielding an emulsion composition within the scope of the invention.

Component (A-3), i.e., the reaction product of organopolysiloxane of formula (I), organopolysiloxane of formula (II) and silica may be obtained by emulsifying a mixture of both the organopolysiloxanes and silica in components (B) and (C), and allowing the organopolysiloxanes and silica to react with each other in the emulsion under the above-mentioned reaction conditions; or by emulsifying a mixture of both the organopolysiloxanes in components (B) and (C), dispersing finely divided silica in a hydrophilic solvent such as ethylene glycol, adding the dispersion to the emulsion, and allowing the organopolysiloxanes and finely divided silica to react with each other in the emulsion under the above-mentioned reaction conditions. In either case, there is obtained an emulsion composition within the scope of the invention.

In the organopolysiloxane emulsion composition, a water-miscible organic solvent having an SP value in the range of 8.0 to 11.0 is preferably added as component (D) for further improving emulsion stability. As used herein, the term "SP value" refers to a solubility parameter which is a measure indicative of the miscibility between liquids proposed by Hildebrand. If an organic solvent having an SP value of less than 8.0 or more than 11.0 is used, the emulsion as emulsified becomes less stable. Thus the SP value should be in the range of 8.0 to 11.0, and preferably in the range of 8.5 to 10.5. The organic solvent should be water-miscible. If the organic solvent is not water-miscible, the emulsion as emulsified becomes less stable. The term "water-miscibility" refers to a solubility of at least 1 g, preferably at least 2 g, in 100 g of water at 20° C.

Typical water-miscible organic solvents include alcoholic compounds, ketone compounds, ester compounds and ether compounds. Illustrative examples include cellosolve, propyl cellosolve, butyl cellosolve, propylene glycol monomethyl ether, propylene glycol monobutyl ether, dipropylene glycol monomethyl ether, methyl carbitol, carbitol, propyl carbitol, butyl carbitol, cellosolve acetate, butyl cellosolve acetate, propylene glycol monomethyl ether acetate, carbitol acetate, butyl carbitol acetate, and 2,2,4-trimethyl-1,3-pentadiol monoisobutyrate. Inter alia, butyl cellosolve, butyl cellosolve acetate, propylene glycol monomethyl ether, propylene glycol monomethyl ether acetate, and 2,2,4-trimethyl-1,3-pentadiol monoisobutyrate are preferred.

An appropriate amount of component (D) added is 1 to 50 parts by weight per 100 parts by weight of component (A-1). Less than 1 part of component (D) contributes less to emulsion stability. More than 50 parts of component (D) does not adversely affect emulsion properties, but is undesirable in that it will volatilize into the environment during service. The amount of component (D) added is preferably 2 to 40 parts, and more preferably 3 to 30 parts by weight per 100 parts by weight of component (A-1). In the alternative embodiment using component (A-3) instead of a mixture of components (A-1) and (A-2), the amount of component (D) should be 1 to 50 parts, preferably 2 to 40 parts, and more preferably 3 to 30 parts by weight per 100 parts by weight of component (A-3).

In the organopolysiloxane emulsion composition of the invention, various additives may be compounded insofar as this does not compromise the objects of the invention.

On use, the organopolysiloxane emulsion composition of the invention is applicable to surfaces of various substrates. The emulsion composition may be applied to substrates by any of prior art well-known coating techniques including dipping, spraying, roll coating, and brush coating. Although the coating weight of the organopolysiloxane emulsion composition is not particularly limited, a coating weight of 0.1 to 200 g/m$^2$, especially 1 to 100 g/m$^2$ is generally employed.

After coating, an organopolysiloxane film may be formed only by drying. The drying step may use any desired conditions under which water and the water-miscible organic solvent volatilize off. At room temperature, drying may continue for 1 to 3 days. When heated, drying may continue at 100 to 180° C. for about 1 to 30 minutes.

The organopolysiloxane emulsion composition of the invention may be used as a coating agent to surfaces of various substrates, a parting or lubricating agent to surfaces of rubber articles, a binder for functional inorganic fillers such as photo-catalysts, and a hand-feel improver for textiles, but its use is not limited thereto.

EXAMPLE

Examples of the invention are given below by way of illustration and not by way of limitation. In the Examples, all percents are by weight and the viscosity is a measurement by a Brookfield (BM model) rotational viscometer at 25° C.

Preparation Example 1

A vacuum stripping equipment was charged with 1,400 g of a 50% toluene solution of an organopolysiloxane comprising trialkylsiloxy and silicate units represented by the compositional formula: $[(CH_3)_3SiO_{1/2}]_{0.39}[SiO_{4/2}]_{0.61}$ (silanol content 0.1 mol/100 g), and 300 g of butyl cellosolve acetate (SP value 8.9) as a water-miscible organic solvent. Only the toluene was vacuum distilled off under the conditions: 50° C. and 20 mmHg, yielding 1,000 g of a mixture A of the organopolysiloxane comprising trialkylsiloxy and silicate units and the water-miscible organic solvent. This mixture was a solution having a non-volatile content of 69.9% upon heating at 150° C./3 hours and a viscosity of 230 mPa·s.

Example 1

A high-speed disperser (Homo Disper®) was charged with 210 g of a hydroxy-terminated organopolysiloxane of the general formula $HO-[(CH_3)_2Si-O]_{400}-H$ having a viscosity of 3,000 mPa·s, 129 g of mixture A of the organopolysiloxane comprising trialkylsiloxy and silicate units and the water-miscible organic solvent, as prepared in Preparation Example 1, 20 g of Noigen XL40 (Dai-Ichi Kogyo Seiyaku Co., Ltd., polyoxyalkylene decyl ether, HLB 10.5), 23 g of Noigen XL400D (Dai-Ichi Kogyo Seiyaku Co., Ltd., 65% aqueous solution of polyoxyalkylene decyl ether, HLB 18.4), 5 g of Newcol 291M (Nippon Nyukazai Co., Ltd., 75% solution of sodium alkylsulfosuccinate) as the emulsifier, and 589.6 g of deionized water. The ingredients were emulsified into a milky white color emulsion. To the emulsion were added 90 g of a dispersion having 20% of Aerosil 200 (Nippon Aerosil Co., Ltd.) dispersed in ethylene glycol and 20 g of a 25% aqueous solution of tetramethylammonium hydroxide. Reaction took place at 15° C. for 24 hours, after which 3.4 g of acetic acid was added for neutralization, yielding a milky white color emulsion B. Emulsion B had a non-volatile content of 29.6% upon heating at 150° C./3 hours, with the non-volatile residue being film-like. When kept at room temperature for 3 months, Emulsion B remained stable without separation.

An amount of this emulsion composition was fed in a tray such that a dry residue might have a thickness of 0.7 mm, dried at room temperature for one week, and further dried at 150° C. for 2 hours, obtaining a rubber sheet. The rubber sheet was measured for tensile strength and elongation in accordance with JIS K6249. The results are shown in Table 1.

Example 2

A high-speed disperser (Homo Disper®) was charged with 120 g of a hydroxy-terminated organopolysiloxane of the general formula HO—[(CH$_3$)$_2$Si—O]$_{400}$—H having a viscosity of 3,000 mPa-s, 120 g of a hydroxy-terminated, amino-modified organopolysiloxane of the general formula HO—[(CH$_3$)$_2$Si—O]$_{1000}$—[(CH$_3$)Si(C$_3$H$_6$NH$_2$)—O]$_{400}$—H having a viscosity of 30,000 mPa-s, 86 g of mixture A of the organopolysiloxane comprising trialkylsiloxy and silicate units and the water-miscible organic solvent, as prepared in Preparation Example 1, 20 g of Noigen XL40 (Dai-Ichi Kogyo Seiyaku Co., Ltd., polyoxyalkylene decyl ether, HLB 10.5), 23 g of Noigen XL400D (Dai-Ichi Kogyo Seiyaku Co., Ltd., 65% aqueous solution of polyoxyalkylene decyl ether, HLB 18.4), 5 g of Newcol 291M (Nippon Nyukazai Co., Ltd., 75% solution of sodium alkylsulfosuccinate) as the emulsifier, and 602.6 g of deionized water. The ingredients were emulsified into a milky white color emulsion. To the emulsion were added 100 g of a dispersion having 20% of Aerosil 200 (Nippon Aerosil Co., Ltd.) dispersed in ethylene glycol and 20 g of a 25% aqueous solution of tetramethylammonium hydroxide. Reaction took place at 15° C. for 24 hours, after which 3.4 g of acetic acid was added for neutralization, yielding a milky white color emulsion C. Emulsion C had a non-volatile content of 29.7% upon heating at 150° C./3 hours, with the non-volatile residue being film-like. When kept at room temperature for 3 months, Emulsion C remained stable without separation.

An amount of this emulsion composition was fed in a tray such that a dry residue might have a thickness of 0.7 mm, dried at room temperature for one week, and further dried at 150° C. for 2 hours, obtaining a rubber sheet. The rubber sheet was measured for tensile strength and elongation in accordance with JIS K6249. The results are shown in Table 1.

Example 3

A high-speed disperser (Homo Disper®) was charged with 210 g of a hydroxy-terminated organopolysiloxane of the general formula HO—[(CH$_3$)$_2$Si—O]$_{400}$—H having a viscosity of 3,000 mPa-s, 129 g of mixture A of the organopolysiloxane comprising trialkylsiloxy and silicate units and the water-miscible organic solvent, as prepared in Preparation Example 1, 20 g of Noigen XL40 (Dai-Ichi Kogyo Seiyaku Co., Ltd., polyoxyalkylene decyl ether, HLB 10.5), 23 g of Noigen XL400D (Dai-Ichi Kogyo Seiyaku Co., Ltd., 65% aqueous solution of polyoxyalkylene decyl ether, HLB 18.4), 5 g of Newcol 291M (Nippon Nyukazai Co., Ltd., 75% solution of sodium alkylsulfosuccinate) as the emulsifier, and 589.6 g of deionized water. The ingredients were emulsified into a milky white color emulsion. To the emulsion was added 20 g of a 25% aqueous solution of tetramethylammonium hydroxide. Reaction took place at 15° C. for 24 hours, after which 3.4 g of acetic acid was added for neutralization. Further, 90 g of a dispersion having 20% of Aerosil 200 (Nippon Aerosil Co., Ltd.) dispersed in ethylene glycol was added and mixed, yielding a milky white color emulsion D. Emulsion D had a non-volatile content of 29.9% upon heating at 150OC/3 hours, with the non-volatile residue being film-like. When kept at room temperature for 3 months, Emulsion B remained stable without separation.

An amount of this emulsion composition was fed in a tray such that a dry residue might have a thickness of 0.7 mm, dried at room temperature for one week, and further dried at 150° C. for 2 hours, obtaining a rubber sheet. The rubber sheet was measured for tensile strength and elongation in accordance with JIS K6249. The results are shown in Table 1.

Comparative Example 1

A high-speed disperser (Homo Disper®) was charged with 210 g of a hydroxy-terminated organopolysiloxane of the general formula HO—[(CH$_3$)$_2$Si—O]$_{400}$—H having a viscosity of 3,000 mPa-s, 129 g of mixture A of the organopolysiloxane comprising trialkylsiloxy and silicate units and the water-miscible organic solvent, as prepared in Preparation Example 1, 20 g of Noigen XL40 (Dai-Ichi Kogyo Seiyaku Co., Ltd., polyoxyalkylene decyl ether, HLB 10.5), 23 g of Noigen XL400D (Dai-Ichi Kogyo Seiyaku Co., Ltd., 65% aqueous solution of polyoxyalkylene decyl ether, HLB 18.4), 5 g of Newcol 291M (Nippon Nyukazai Co., Ltd., 75% solution of sodium alkylsulfosuccinate) as the emulsifier, and 589.6 g of deionized water. The ingredients were emulsified into a milky white color emulsion. To the emulsion was added 20 g of a 25% aqueous solution of tetramethylammonium hydroxide. Reaction took place at 15° C. for 24 hours, after which 3.4 g of acetic acid was added for neutralization, yielding a milky white color emulsion E. Emulsion E had a non-volatile content of 31.5% upon heating at 150° .C/3 hours, with the non-volatile residue being film-like. When kept at room temperature for 3 months, Emulsion E remained stable without separation.

An amount of this emulsion composition was fed in a tray such that a dry residue might have a thickness of 0.7 mm, dried at room temperature for one week, and further dried at 150° C. for 2 hours, obtaining a rubber sheet. The rubber sheet was measured for tensile strength and elongation in accordance with JIS K6249. The results are shown in Table 1.

Comparative Example 2

The procedure of Comparative Example 1 was repeated except that the hydroxy-terminated organopolysiloxane was changed to a mixture of 120 g of a hydroxy-terminated organopolysiloxane of the general formula HO—[(CH$_3$)$_2$Si—O]$_{400}$—H having a viscosity of 3,000 mPa-s and 120 g of a hydroxy-terminated, amino-modified organopolysiloxane of the general formula HO—[(CH$_3$)$_2$Si—O]$_{1000}$—[(CH$_3$)Si(C$_3$H$_6$NH$_2$)—O]$_4$—H having a viscosity of 30,000 mPa-s, and the amount of mixture A of the organopolysiloxane comprising trialkylsiloxy and silicate units and the water-miscible organic solvent, as prepared in Preparation Example 1, was 86 g. There was obtained a milky white color emulsion F. Emulsion F had a non-volatile content of 31.7% upon heating at 150° C./3 hours, with the non-volatile residue being film-like. When kept at room temperature for 3 months, Emulsion C remained stable without separation.

An amount of this emulsion composition was fed in a tray such that a dry residue might have a thickness of 0.7 mm, dried at room temperature for one week, and further dried at 150° C. for 2 hours, obtaining a rubber sheet. The rubber sheet was measured for tensile strength and elongation in accordance with JIS K6249. The results are shown in Table 1.

TABLE 1

|  |  | Example 1 | Example 2 | Example 3 | Comparative Example 1 | Comparative Example 2 |
|---|---|---|---|---|---|---|
| Reactants for film-forming component, wt % | Hydroxy-terminated organopolysiloxane | 66.0 | 75.4 | 66.0 | 70 | 80 |
|  | Organopolysiloxane comprising trialkylsiloxy and silicate units | 28.3 | 18.9 | 28.3 | 30 | 20 |
|  | Silica | 5.7 | 5.7 | 5.7 | — | — |
| Components, pbw | (A-1) Reaction product of hydroxy-terminated organopolysiloxane with organopolysiloxane comprising trialkylsiloxy and silicate units | — | — | 100 | 100 | 100 |
|  | (A-2) Silica | — | — | 6.0 | — | — |
|  | (A-3) Reaction product of hydroxy-terminated organopolysiloxane, organopolysiloxane comprising trialkylsiloxy and silicate units, and silica | 100 | 100 | — | — | — |
|  | (B) Emulsifier | 12.2 | 12.2 | 12.9 | 12.9 | 12.9 |
|  | (C) Water | 192.9 | 197.0 | 204.4 | 204.4 | 208.8 |
|  | (D) Water-miscible organic solvent | 12.2 | 8.1 | 12.9 | 12.9 | 8.6 |
| Dry film | Tensile strength, MPa | 1.4 | 1.1 | 1.0 | 0.8 | 0.6 |
|  | Elongation, % | 320 | 310 | 250 | 200 | 170 |

It has been demonstrated that an organopolysiloxane film is improved in rubber strength and elongation by using silica in combination with the reaction (product) of a hydroxy-terminated organopolysiloxane with an organopolysiloxane comprising trialkylsiloxy and silicate units.

Japanese Patent Application No. 2008-041372 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A film-forming organopolysiloxane emulsion composition comprising (A-3) 100 parts by weight of the condensation reaction product of a hydroxy-terminated organopolysiloxane represented by the general formula (I) with an organopolysiloxane comprising trialkylsiloxy and silicate units and having silanol groups, represented by the compositional formula (II) and silica having silanol groups on its surface:

$$HO-[R^1_2SiO]_n-H \tag{I}$$

wherein $R^1$ is a monovalent organic group of 1 to 20 carbon atoms, hydroxyl or hydrogen, and n is a positive number of 2 to 5,000, $$[R^2_3SiO_{1/2}]_a[R^2_2SiO_{2/2}]_b[SiO_{4/2}]_c \tag{II}$$

wherein $R^2$ is a monovalent organic group of 1 to 20 carbon atoms, hydroxyl or hydrogen, a, b and c are positive numbers in the range: $0.1 \leq a \leq 0.7$, $0 \leq b \leq 0.5$, $0.3 \leq c \leq 0.7$, and $a+b+c=1$, (B) 1 to 50 parts by weight of an emulsifier, and (C) 25 to 20,000 parts by weight of water.

2. A film-forming organopolysiloxane emulsion composition comprising (A-3) 100 parts by weight of the condensation reaction product of a hydroxy-terminated organopolysiloxane represented by the general formula (I) with an organopolysiloxane comprising trialkylsiloxy and silicate units and having silanol groups, represented by the compositional formula (II) and silica having silanol groups on its surface:

$$HO-[R^1_2SiO]_n-H \tag{I}$$

wherein $R^1$ is a monovalent organic group of 1 to 20 carbon atoms, hydroxyl or hydrogen, and n is a positive number of 2 to 5,000, $$[R^2_3SiO_{1/2}]_a[R^2_2SiO_{2/2}]_b[SiO_{4/2}]_c \tag{II}$$

wherein $R^2$ is a monovalent organic group of 1 to 20 carbon atoms, hydroxyl or hydrogen, a, b and c are positive numbers in the range: $0.1 \leq a \leq 0.7$, $0 \leq b \leq 0.5$, $0.3 \leq c \leq 0.7$, and $a+b+c=1$, (B) 1 to 50 parts by weight of an emulsifier, (C) 25 to 20,000 parts by weight of water, and (D) 1 to 50 parts by weight of a water-miscible organic solvent having an SP value in the range of 8.0 to 11.0.

* * * * *